United States Patent [19]

Agnew et al.

[11] Patent Number: 4,514,803

[45] Date of Patent: Apr. 30, 1985

[54] METHODS FOR PARTITIONING MAINFRAME INSTRUCTION SETS TO IMPLEMENT MICROPROCESSOR BASED EMULATION THEREOF

[75] Inventors: Palmer W. Agnew, Owego; Joseph P. Buonomo, Endicott; Steven R. Houghtalen, Endicott; Anne S. Kellerman, Endicott; Raymond E. Losinger, Endicott; James W. Valashinas, Endicott, all of N.Y.

[73] Assignee: International Business Machines Corporation, Armonk, N.Y.

[21] Appl. No.: 371,634

[22] Filed: Apr. 26, 1982

[51] Int. Cl.³ .............................................. G06F 9/22
[52] U.S. Cl. .................................................. 364/200
[58] Field of Search ... 364/200 MS File, 900 MS File

[56] References Cited

U.S. PATENT DOCUMENTS 4,128,876 12/1978 Ames et al. ......................... 364/200
4,354,225 10/1982 Frieder et al. ...................... 364/200
4,356,546 10/1982 Whiteside et al. .................. 364/200

OTHER PUBLICATIONS

*Microprocessor Implementation of Mainframe Processors by Means of Architecture Partitioning*–Agnew et al.–IBM Journal R&D, vol. 26, No. 4, 1962.

*Primary Examiner*—Harvey E. Springborn
*Attorney, Agent, or Firm*—Saul A. Seinberg

[57] ABSTRACT

Methods of applying LSI and microprocessors to the design of microprocessor-based LSI implementation of mainframe processors are described. A mainframe instruction set is partitioned into two or more subsets, each of which can be implemented by a microprocessor having special on-chip microcode or by a standard off-the-shelf microprocessor running programs written for that purpose. Alternatively, one or more of the subsets can be implemented by a single microprocessor. In addition, a subset of the partitioned instruction set can be implemented by emulating software, by off-chip vertical or horizontal microcode, or by primitives. But, however partitioning is implemented, the end result thereof is to keep the critical flow paths, associated with the most frequently used instruction subset, as short as possible by constraining them to a single chip. The application of this method requires partitioning that makes each identified high performance subset executable on one microprocessor in the current state of technology, a way to quickly pass control back and forth between all of the microprocessors, a suitable way to pass data back and forth between all of the microprocessors, and a technology in which it is economically feasible to have several copies of a complex data flow and control store mechanism.

27 Claims, 8 Drawing Figures

METHODS FOR PARTITIONING MAINFRAME INSTRUCTION SETS TO IMPLEMENT MICROPROCESSOR BASED EMULATION THEREOF

BACKGROUND OF THE INVENTION

1. Field of the Invention

This invention is concerned with methods for partitioning the large instruction sets of mainframe computing systems in order that such partitioned sets can be run by a plurality of microprocessors. More particularly, this invention relates to methodology for partitioning mainframe instruction sets to obtain the most effective cost/performance emulation of the mainframe instruction set through microprocessor implementation thereof.

2. Description of the Prior Art

One noteworthy characteristic of this era of integrated circuits is that higher performance computers use lower levels of integration. This is the result of individual optimizations across the performance spectrum. Since the price of a state-of-the-art silicon chip is, on balance, independent of the level of integration, the price per gate is lower for microcomputers that for super computers. One result of this situation has been the complete reversal of Grosch's Law which stated that payment of twice as much for a computer would provide four times as much processing power. This meant that one would achieve the best cost/performance from the largest computer that could be justified when its resources were shared among many unrelated users. As amended by the most recent technological advances and designs, the reversal of Grosch's Law now implies that the best cost/performance will be obtained from the smallest computer that will perform an application in an acceptable time.

Large scale integration or LSI has played a major role in the cost/performance improvements of all computing systems, particularly in reducing storage costs. However, LSI has been much more effective in reducing the costs of low performance processors having simple architectures than of high performance processors having complex architectures. This property of LSI favors implementing high performance computers using large numbers of low performance processors and storage chips. However, this implementation is difficult to apply to existing complex architectures intended for uni-processors that process a single stream of instructions. This limitation is best understood by considering the basic nature and effect of LSI on digital designs.

Recent improvements in the cost/performance of digital computer systems have been driven by the availability of increasingly denser LSI chips. Denser LSI memory chips, with reduced costs per bit stored, have direct and obvious applicability to digital systems over the entire application range from hand held calculators to super computers. Denser LSI logic chips, however, apply most naturally to digital systems near the low end of the performance and complexity spectrum.

LSI, as previously noted, applies naturally to very small digital systems. The logic portion of a hand calculator, microwave oven, or wrist watch, including the necessary memory and I/O device interfaces, can be implemented on a single LSI microcomputer chip. A small personal computer can be readily realized by using a single microprocessor chip, to implement the entire instruction set of the computer, together with other LSI chips which implement the interfaces between the microprocessor and the memory, keyboard, display tube, disks, printers, and communication lines. This is an example of partitioning a digital system's function for implementation by several LSI chips. This functional partitioning method is simple, well known, and straightforward because the instruction processing function can be accomplished entirely by a single chip.

Methods of applying LSI technology to the implementation of still more powerful digital systems, in which the state of the LSI art does not permit implementing the entire instruction processing function on a single LSI chip, are far less obvious. A first approach would be simply to wait until technology advances far enough to contain a desired architecture, of a given complexity, on a single chip. Unfortunately, this approach has its pitfalls. For example, the architecture of each generation's state-of-the-art microprocessor was determined by the then current capability of the technology, which explains why today's leading microprocessors lack floating-point instructions. The most significant disadvantage of this method is that it precludes implementing a pre-defined architecture that does not happen to fit within one chip in the current technology. This has led to the major software problems inherent in having each generation of microprocessors implement an essentially new architecture.

Another method of employing LSI in the larger, more complex processing systems is to partition the instruction execution function so that the data flow is on one chip and the microcode that controls the data flow is on one or more other chips. This method is the obvious application of LSI technology, separately, to the data flow and to the control store. Unfortunately, this method relinquishes the main advantage of LSI implementation, namely, that of having the control store and the data flow that it controls, both on the same chip. In most processors, the critical path runs from control store, to data flow, to arithmetic result, to address of the next control store word. Its length, in nanoseconds, determines the microcycle time and hence the instruction processing rate of the processor. For a given power dissipation, a critical path that remains wholly on one LSI chip results in a shorter cycle time than that of a critical path that must traverse several inches of conductor and a number of chip-to-card pin connections.

This off-chip microcode partitioning method also requires what LSI technology is least adept at providing, namely, large numbers of pins. The data flow chip needs at least a dozen pins to tell the control store what microword to give it next. Even worse, the data flow chip needs from 16 to 100 pins to receive that control word. A processor using this method is often limited to roughly 16-bit control words, and hence a vertical microprogram that can control only one operation at a time, whereas a far higher performance processor could be designed if a 100-bit control word were available. If available, such 100-bit control words would permit a horizontal microprogram that can control several operations in each micro-cycle and thus perform a given function in fewer cycles. It should be noted that the off-chip microcode partitioning method has been particularly successful when applied to bit-slice processors, in which the data flow is not reduced to a single chip, but rather is a collection of chips, each of which implements a particular group of bits thoughout the data flow. Bit-slice processors usually employ bipolar technologies whose densities are limited by the number of gates available, or the ability to cool them, rather than by the number of pins on the chips. The off-chip microcode partitioning method applies to FET implementations only in more unusual cases where many pins are available and the chip density happens to exactly match the number of gates needed to implement the data flow of a desired processor. The Toshiba T88000 16-bit microprocessor happens to meet these conditions. Such an implementation can be best viewed as a bit-slice design in which the implementable slice width has widened to encompass the entire desired dataflow.

Each major microprocessor manufacturer has faced the need to implement an architecture more complex that can be put onto a single LSI chip. Some needed to implement pre-existing architectures in order to achieve software compatibility with installed machines. Others sought to enhance the functions of existing successful one-chip microprocessors by adding further instructions.

For example, Digital Equipment Corporation needed a low-end implementation of their PDP-11 minicomputer architecture. They chose the off-chip microcode partitioning method. The result was the LSI 11 four-chip set manufactured first by Western Digital Corporation and then by Digital Equipment Corporation itself.

Intel Corporation needed to add hardware computational power, particularly floating-point instructions, to its 8086 microprocessor systems. For this purpose, they developed a "co-processor", the 8087. A processing system containing both an 8086 chip and an 8087 chip operates as follows. The chips fetch each instruction simultaneously. If the instruction is one that the 8086 can execute, it executes the instruction and both chips fetch the next instruction. If the instruction is one that the 8087 executes, the 8087 starts to execute it. In the usual case where a main store address is required, the 8086 computes the address and puts it on the bus shared with the 8087. The 8087 uses that address to complete execution of the instruction and then signals the 8086 that it is ready for both of them to fetch the next instruction. Thus, each chip looks at each instruction and executes its assigned subset, but only the 8086 computes addresses.

Zilog Corporation similarly needed to add floating-point instructions to its Z8000 microprocessor and developed an Extended Processing Unit or EPU. A system containing a Z8000 and one or more EPUs works as follows. The Z8000 fetches an instruction. If the Z8000 can execute the instruction, it does so. Otherwise, the Z8000 issues a request for service by an EPU and supplies an identifier (ID) that it determines by examining the instruction. One EPU recognizes that ID as its own and begins executing. The EPU can use special wires to the Z8000 to instruct the Z8000 to move necessary data back and forth between the EPU and the main store. The Z8000 proceeds to fetch and execute more instructions while the EPU is working, and only stops to wait for the EPU if it requests service by the same EPU while that EPU is still busy. Thus, it is the responsibility of the Z8000 to start the EPU and respond to commands from the EPU. A great deal of execution overlap is possible in such a system.

National Semiconductor Corporation had a similar requirement to add floating-point instructions to its NS-16000 microprocessor systems. It called the NS-16000 a "master" and called the computational processor a "slave". In a system containing a master and a slave, the master fetches instructions and executes them if it can. When the master fetches an instruction it cannot execute, it selects a slave to begin execution. The master sends the instruction and any needed data to the slave, waits for the slave to signal completion, receives the result, and proceeds to fetch the next instruction. Thus, the master never overlaps its execution with the slave's execution and is responsible for knowing what the slave is doing and what it needs.

Data General Corporation needed an LSI implementation of its Eclipse minicomputer architecture. The resulting MicroEclipse family employs a one-chip processor that contains the data flow as well as the horizontal (35-bit) and vertical (18-bit) microcode for executing the most performance-critical instructions in the architecture. This processor can call for vertical microwords from an off-chip control store, as necessary, to execute the rest of the instructions in the architecture by making use of the on-chip horizontal microwords. This is a variant of the other approaches described above with some of the advantages of both the off-chip control-store method and the instruction-set partitioning of a main frame instruction set method.

Designs that partitioned off I/O functions for implementation on dedicated microprocessors were common and none of the advanced microprocessor partitioning methods previously discussed had yet appeared when the present invention was conceived. Partitioning of functions within a central processing unit for implementation on separate processors had been employed in super computers. Their goal was separate execution units for fixed-point, floating-point, and perhaps decimal instructions, that could overlap execution to achieve maximum throughput.

OBJECTS AND SUMMARY OF THE INVENTION

Accordingly, it is a principal object of the present invention to provide methods for implementing large system instruction sets in a manner that minimizes the critical path.

It is also a principal object of the present invention to provide a method of implementing large and/or complex instruction sets in a manner that retains the critical path on one LSI chip.

It is another object of the present invention to provide methodology for implementing large and/or complex instruction sets in an efficient manner that takes maximum advantage of LSI technology without the need of providing a very large number of different custom chips.

These and other objects of the present invention in using LSI to implement an architecture that is too large or complex to implement on one chip are realized by partitioning the instruction set of the architecture itself into subsets that are each microprocessor implemented. This method of utilizing select architectural subsets preserves the main advantage of a one-chip implementation, namely, keeping each critical path on a single chip. For each subset of the instructions, for which execution time is important to system performance, the corresponding microprocessor chip contains the data flow path and all elements, including registers, necessary for the execution of that subset as well as the microcode that controls execution. The application of this method requires partitioning that makes each identified important subset fit on one microprocessor in the current state of technology, a way to quickly pass control back and forth between all of the microprocessors, a suitable way to pass data back and forth between all of the microprocessors, and a technology in which it is economically feasible to have several copies of a complex data flow and control store mechanism.

BRIEF DESCRIPTION OF THE DRAWINGS

The invention will be described further, by way of preferred examples thereof, with reference to the accompanying drawings wherein.

DESCRIPTION OF THE PREFERRED EMBODIMENT

Mainframe architecture can be microprocessor implemented in many ways with any one or more specific goals or criteria in mind. The goal of the present invention is to optimize cost/performance, not performance, at the low end of the mainframe spectrum. To achieve that end, it was decided to use a microprocessor that was general purpose in design, that was significantly microcoded thereby allowing architectural tuning and that had an appropriate number of 32-bit general purpose registers. Motorola's 16 bit processor, the 68000, was an excellent choice that fit this description rather well. This MPU implementation approach was selected due to projections that HMOS and comparable FET technologies would require a wait of several years before they would permit implementation of mainframe architecture on a single chip.

As used herein, the terms "mainframe architecture" or "mainframe instruction set" identify or refer to the architecture or instruction set of general purpose digital computers of the type that have a rich and varied instruction set, typically several hundred in number, a relatively wide word size, typically four bytes, and a complete methodology for handling exception conditions. The IBM 4331, manufactured by International Business Machines Corporation, is considered to be a such a mainframe computer at the low end of the spectrum. Further, as used herein, "System/370" is a term that identifies a range of computers, also manufactured by International Business Machines Corporation, the details of which are well known and publicly documented, that also fall within the scope of the foregoing definition of a mainframe. In addition, as used herein, the term "critical path" defines a path that runs from the control store, to data flow, to arithmetic result, to address of the next control store word. Its length, in nanoseconds, determines the microcycle time and hence the instruction processing rate of the processor. For a given power dissipation, a critical path that remains wholly on one LSI chip results in a shorter cycle time than that of a critical path that must traverse several inches of conductor and a number of chip-to-card pin connections.

The following descriptions of several approaches to solving the problems of single chip mainframe implementation are limited to the instruction processing portion of a computer. Each approach provides a local bus within the instruction processing portion on which one or more microprocessor chips can communicate with each other and with a local store. Each approach assumes that the local bus can be connected to a global bus to allow the instruction processing portion to communicate with I/O devices and main memory. At other times, the local bus is disconnected from the global bus so that separate communications can occur over the two buses.

A. Two Overlapping Subsets

Figure 1:
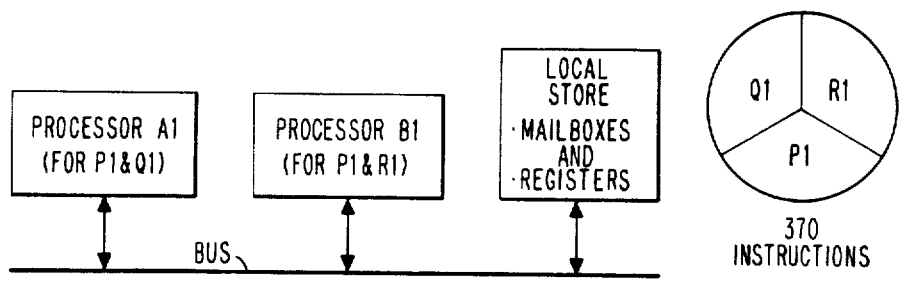
FIG. 1 schematically illustrates a partitioned mainframe instruction set in accordance with the present invention, said partitioned set having two overlapping subsets.

The first approach to partitioning a mainframe architecture employs two specially microcoded microprocessors A1 and B1 that implement overlapping subsets of the architecture, as schematically depicted in FIG. 1. Each of the microprocessors is provided with on-chip microcode that replaces the standard microprograms that are usually found in a 68000. This overlapping emulation is achieved in the following manner. The mainframe architecture is partitioned into three sets named P1, Q1 and R1, with most of the high-frequency use instructions being in set P1.

As employed in this description, the terms "most frequently used instructions" or "high-frequency use instructions" or any other term having similar connotation refers to those instructions in the entire set that are used the most when a typical group of user programs is run on a mainframe and the resulting instruction mix is surveyed. It has been found that at least 70%, and usually 75%, of such frequently used instructions can be grouped in the key or prime subset, subset P1 in this approach, and will account for approximately 95% or more of use of the computing system.

The special microcode referred to above is written for the combination of sets P1 and Q1 to reside in processor A1 and microcode is written for the combination of sets P1 and R1 to reside in processor B1, as shown in FIG. 1. At any one time, only one of the processors is "active", and the other processor is "passive". Only the active processor fetches and executes instructions and controls the bus. There is no contention between the processors.

This approach functions in the following manner. Assume that the last several instructions have all been either in set P1 or in set Q1. Thus, processor A1 is active and processor B1 is passive. Note that the internal values of processor A1 (I-counter, general purpose registers, condition code, etc.) are up-to-date, and the internal values of processor B1 are not. If the next instruction is in set R1, processor A1 fetches this instruction and performs the following operations:

1. it places all of its internal values, that processor B1 might need in order to execute any instructions in sets P1 or R1, into a mailbox in a local store;
2. it taps processor B1 on the shoulder, telling it to become the active processor, that is, to read new internal values from the mailbox and to then execute instructions as long as instructions remain in set R1 or set P1; and
3. it becomes the passive processor until, sometime later, it feels a shoulder tap from processor B1 telling it to read internal values and execute an instruction in set Q1 and then continue executing all instructions up to the next instruction in set R1.

The sets P1, Q1, and R1 are selected based on the following criteria. First, all of the high-usage instructions are placed in set P1, which is common to both processors, thereby greatly reducing the frequency of swapping the active and passive processors. This is desirable because, between swaps, instructions are executed as fast as if they were all implemented in the microcode of a single processor. Second, the frequency of processor swaps is reduced still further if sets Q1 and R1 are selected in such a way that instructions in these two sets seldom interleave with each other. One particularly suitable instruction set partition scheme is to have set P1 contain only fixed-point, branch, and load instructions, have set Q1 contain only floating-point instructions, and have set R1 contain only decimal and privileged instructions. This selection satisfies both criteria. First, the fixed-point, branch, and load/store instructions represent about 75% of the execution time in a typical mainframe instruction mix. Second, although there is frequent interleaving of floating-point, branch, and load instructions with either fixed-point instructions or decimal instructions, there is much less frequent interleaving of floating-point instructions with decimal instructions. Therefore, there is relatively little performance lost to swapping active and passive processors if this selection of P1, Q1, and R1 is made. In fact, a need for both floating-point and decimal instructions in the same application is sufficiently rare that special-purpose systems containing only one of microprocessor A1 or microprocessor B1 could be attractive.

If a selection is made in which instructions in sets Q1 and R1 frequently interleave, but have rather independent internal value modification characteristics, then an additional manipulation could be used to shorten the processor swap overhead time. This would be to have the passive processor actually executing instructions in set P1 along with the active processor, listening to the bus, and updating its internal values, but not controlling the bus or affecting any external values. In addition, the passive processor would decode those instructions not implemented in its own microcode just enough to see whether each such instruction would affect its internal values other than the I-counter and Condition Code (CC). If so, the passive processor would set a bit indicating that it must read internal values from the mailbox when it again becomes the active processor. If it becomes the active processor when this bit is still reset, then the passive processor would read in only the I-counter and CC values when it thereafter accessed the mailbox. This strategy often reduces the time required to swap the active and passive processors, although it does not reduce the frequency of swapping.

Figure 2:
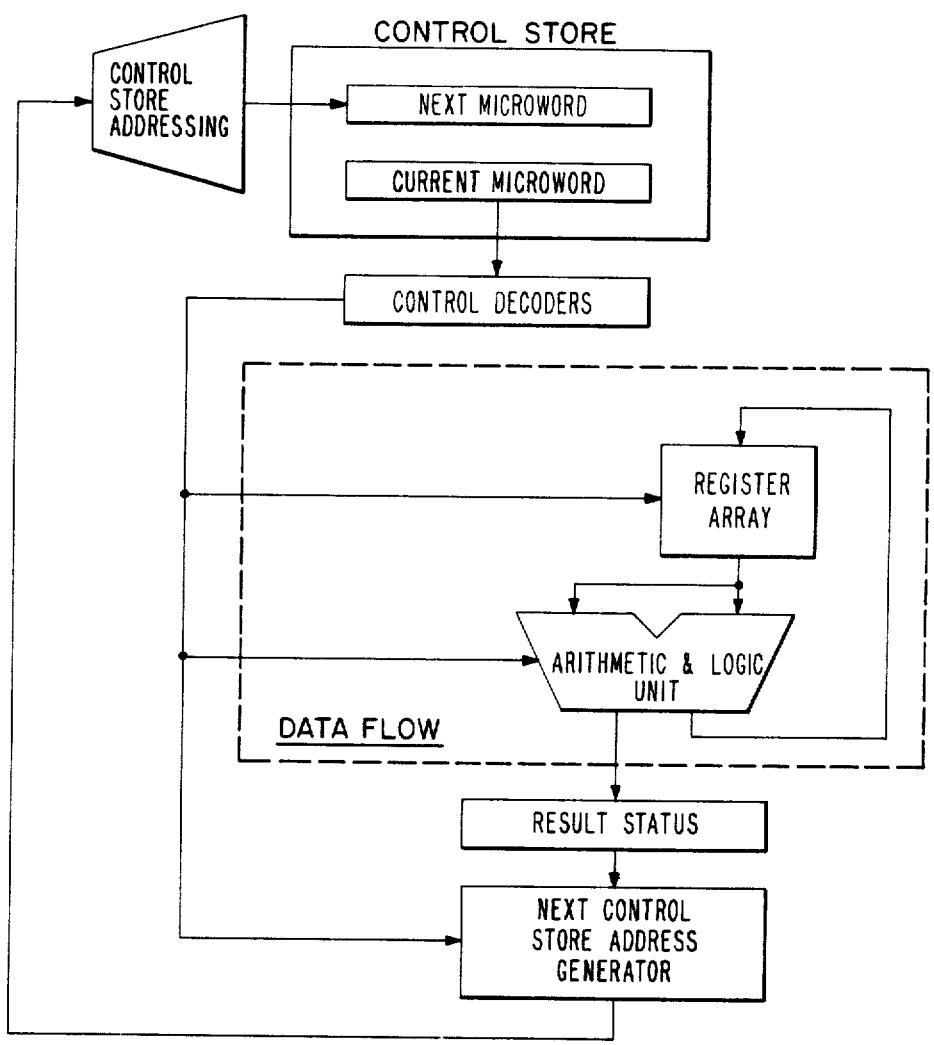
FIG. 2 schematically reveals the critical path of a computing system, in particular, the critical path as it is comprehended by the present invention.

It should be noted that the foregoing partitioning method keeps the critical path of either microprocessor chip to an absolute minimum, since there is no deviation from the path shown in FIG. 2. As used herein, the "critical path" in all of described approaches defines a path, as shown in FIG. 2 by way of example, that runs from the control store, to data flow (the dashed box), to arithmetic result, to address of the next control store word. The length of the critical path, in nanoseconds, determines the microcycle time and, hence, the instruction processing rate of the processor.

B. Four Subsets, Three Microcoded

Figure 3:
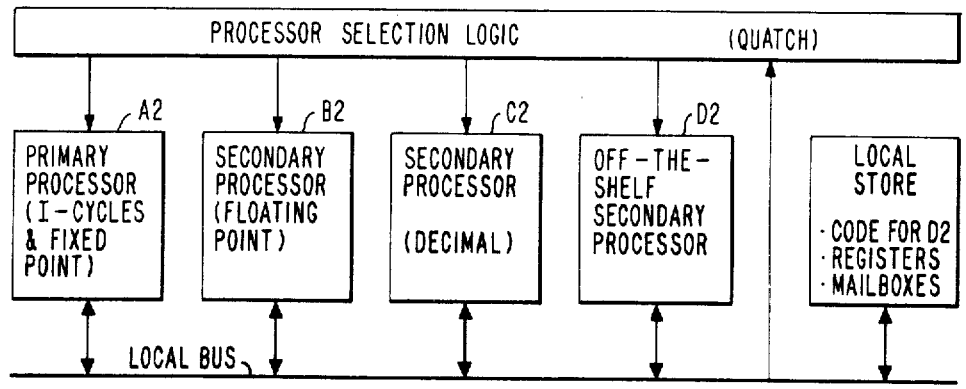
FIG. 3 schematically depicts another partitioned mainframe instruction set in accordance with the present invention, said partitioned instruction set having four subsets, three of which are implemented by on-chip microcode and the other of which is implemented by higher level instructions stored in memory chips.

The second approach to partitioning, employs four microprocessors as shown in FIG. 3. Three of these, a primary processor A2 and two secondary processors, B2 and C2, are Motorola Corporation 68000s with special on-chip microprograms that replace the 68000's standard microprograms. The first of these specially microcoded processors A2 is utilized to implement I-cycles (instruction fetch and decode and effective-address calculation) for all instructions, and E-cycles (instruction execution) for the fixed-point, load, and branch instructions. The register space of this processor is used for the general purpose registers (GPRs). It should be noted that its on-chip microcode implements all functions that make heavy use of the GPRs, so the critical path remains on and is contained within one chip. The second of the special microprocessors B2 is employed to implement E-Cycles for floating-point instructions. Half of the register space in this microprocessor is used for the floating-point registers (FPRs) and the other half is used for work space. Again, the microcode is on the same chip as the registers and, of course, the data flow that it controls. An alternative design employs a different microprocessor chip that can execute floating-point instructions faster because its data flow is wide enough to process most common floating-point variables in parallel. The third of the specially coded microprocessors C2 is used to handle the E-Cycles for decimal instructions. All of the register space in this microprocessor is available for work space, since decimal instructions have storage-to-storage format.

The fourth microprocessor D2 is off-the-shelf, that is, it contains the standard Motorola microcode that implements the instruction set of the 68000. The part of the System/370 architecture not implemented by microcode, namely, privileged instructions, exception or error conditions, address translation misses, and interrupt handling, are simulated by sequences of 68000 instructions that are stored in a separate local store, rather than on a microprocessor chip. This is appropriate because these instructions and functions are used infrequently so maximum speed is not required, are error-prone so early models should have them in easily changed PROMs, and are voluminous so they can be written more economically in the relatively high-level 68000 machine language rather than in the very low-level 68000 horizontal microcode language.

A system containing these four microprocessors operates as follows. The first or primary microprocessor A2 fetches an instruction. If it can execute the instruction, it does so. If not, the primary hands off control to one of the other or secondary microprocessors, B2 or C2. This involves, first, passing necessary data such as the operation code and effective address in predefined local store locations and, second, setting a new value into the four-state circuit (Quatch) whose state determines which microprocessor has control of the local bus that connects all four microprocessors and their local store, in parallel, to the rest of the system. The selected secondary runs, with full control of the local bus and full access to the main store and I/O system, until it has completed execution of the instruction it was given. Then, it sets the original value back into the Quatch, handing control back to the primary. At this point, the primary looks at a return code in local store and proceeds to fetch the next instruction, or passes control to the off-the-shelf secondary microprocessor for instruction error handling. Note that this mechanism for passing control allows a secondary microprocessor responsible for floating-point or decimal instructions to call on the off-the-shelf secondary to complete an instruction that detected an error. Thus, the error handling function, which is voluminous and not critical to performance, need not occupy valuable control store space on the floating-point secondary chip.

The desirability of this approach's partitioning of the System/370 architecture can be seen by noting that the primary processor runs more than 75% of the time when executing typical job mixes, and has to hand only one instruction in twenty over to a secondary processor.

C. Two Subsets, One Microcoded

The third approach to partitioning is similar to the second, but only employs a single specially microcoded microprocessor A3 and a standard coded microprocessor B3. This approach combines the excellent cost/performance of on-chip microcode for the most critical functions with the flexibility, extendibility, and low development cost of off-chip microprocessor code for less critical functions. It uses the structure shown in FIG. 4 and works as follows. Processor A3, called the primary processor, contains the general purpose registers (GPRs) and the microcode for all functions that make heavy use of GPRs. It performs I-cycles for all instructions. It also performs E-cycles for the most frequently used instructions, that is, for almost all instructions except floating-point, decimal, and privileged instructions. In a typical instruction mix, the instructions that the primary processor executes constitute about 95% of the instructions by frequency of occurrence and about 5% of the instructions by execution time. Because the primary processor also performs I-cycles for all instructions, it actually runs more than 50% of the time.

The primary processor A3 is also responsible for detecting instructions for which it does not contain the execution microcode. It hands over control to the secondary processor B3 to complete such instructions. Most of the decimal, floating-point, and privileged instructions do a relatively large amount of data processing or are used very infrequently in typical instruction mixes. Therefore, the time to pass control from the primary processor to the secondary processor, and back, is relatively small. The secondary processor carries out the necessary processing under control of code contained in the local store. The same local store contains other registers, such as the floating point registers, and the mailboxes in which the processors leave instruction codes, operand addresses, condition codes, and other necessary data as they pass control back and forth. Control of the two processors is simple because only one of them is ever running at any one time. There is no overlap and no bus contention. Either processor can pass control to the other by inverting the state of the two-state latch that determines which of them is granted use of the bus.

It is important to note that a state-of-the-art microprocessor, the Motorola 68000, has been used to successfully implement a reasonably high-level machine language. This is the language in which most of the mainframe architecture is coded when using this approach to partitioning. Development of this code is rapid and inexpensive, in comparison to writing in a low-level microcode language. Moreover, the code resides in local store where it is easy to change, in comparison to microcode residing on a microprocessor chip. The corresponding disadvantage is that code implementing instructions tend to run longer than microcode implementing the same instructions. Therefore, there is a performance imbalance between the high-usage instructions, which are implemented in microcode, and the low-usage instructions, which are implemented in code.

D. Subset With Emulation

Figure 5:
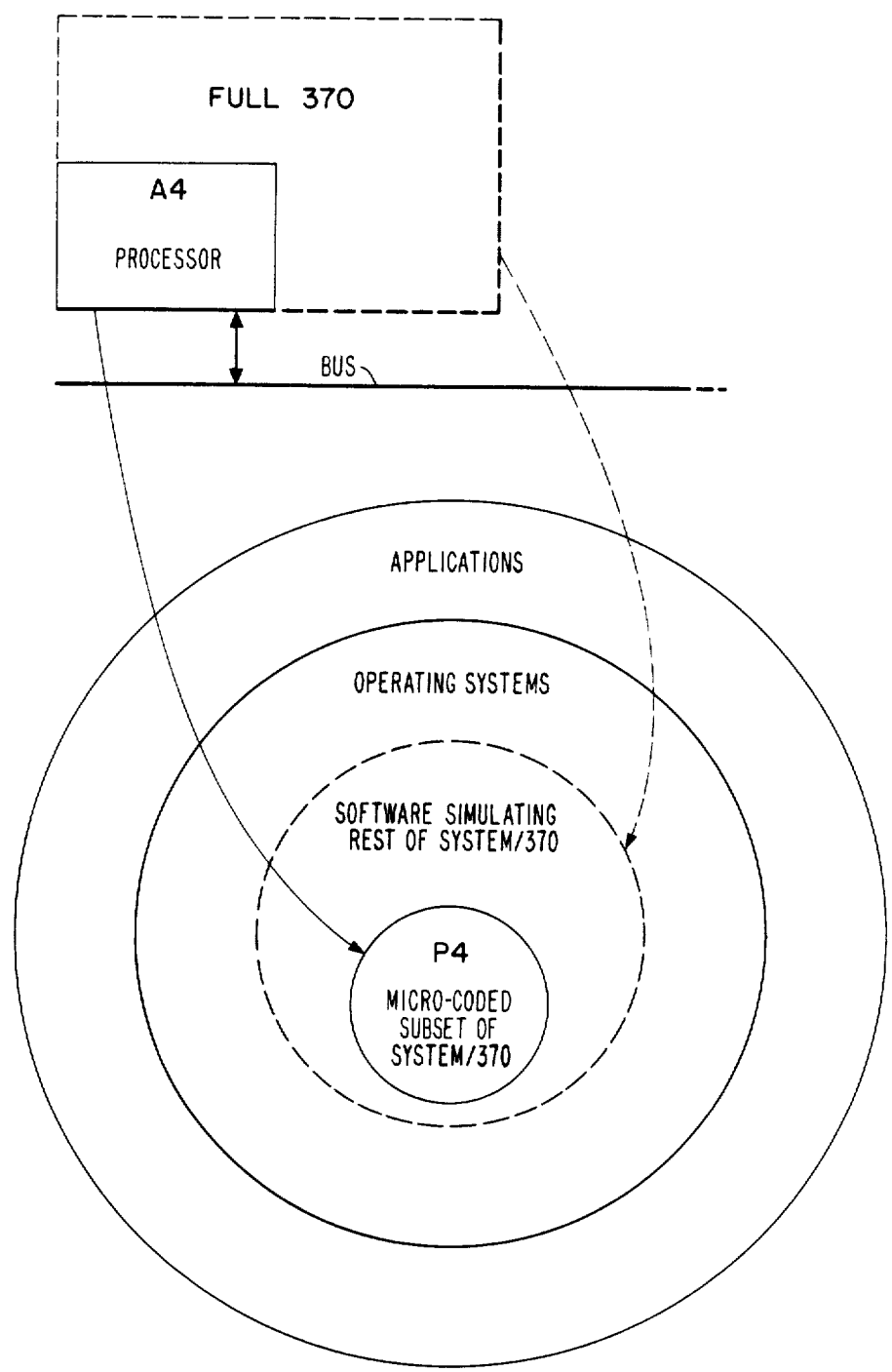
FIG. 5 schematically depicts a further partitioned mainframe instruction set, partitioned in accordance with the present invention, said partitioned instruction set having only one on-chip implemented subset.

The fourth approach relies heavily on software to implement parts of the architecture that cannot be placed on a single microprocessor chip, as is illustrated in FIG. 5. In using this approach, one first defines a suitable subset P4 of the mainframe architecture, implements this subset as the "machine" architecture of the microprocessor chip, and then writes a first layer of software to raise the level of the subset to the level of full mainframe architecture. The subset P4 must include sufficient instructions and functions to enable the first layer of software to simulate the rest of the mainframe architecture, including preservation of system integrity.

Figure 4:
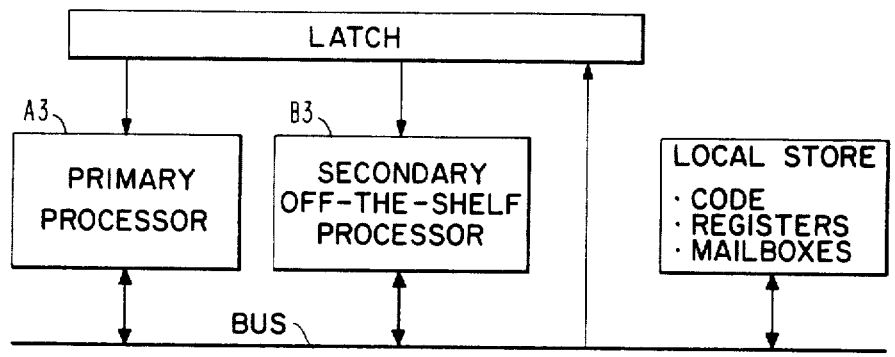
FIG. 4 schematically shows another partitioned mainframe instruction set in accordance with the present invention, said partitioned instruction set having two subsets, only one of which is implemented by on-chip microcode and the other of which is implemented by higher level instructions stored in memory chips.

In some applications, no such first software layer is necessary. It might be possible to run some System/360 software, that which does not use new functions introduced in System/370, directly on the machine interface of the microprocessor chip. The selected subset might suffice for many OEM type applications, such as intelligent terminals, intelligent printers, and test-equipment control. Applications in turnkey "applications machines" could be written for the subset with customers or users never knowing that the subset was there. In other applications, missing instructions can be replaced by subroutine calls at compile time. In the remaining applications, the operating system, as shown in FIG. 4, can have a first layer that handles "invalid operation" program interruptions by simulating the missing instructions instead of passing these interruptions up to the next-higher layer.

This solution of the problem of insufficient control store space has the advantages of minimal hardware development cost, risk, and time, as well as excellent product cost/performance for applications that employ only the selected subset. However, it has the disadvantages of a large mix imbalance in any sort of software simulation of missing instructions, and an increased maximum interrupt latency time.

E. Off-Chip Vertical Microcode

Figure 6:
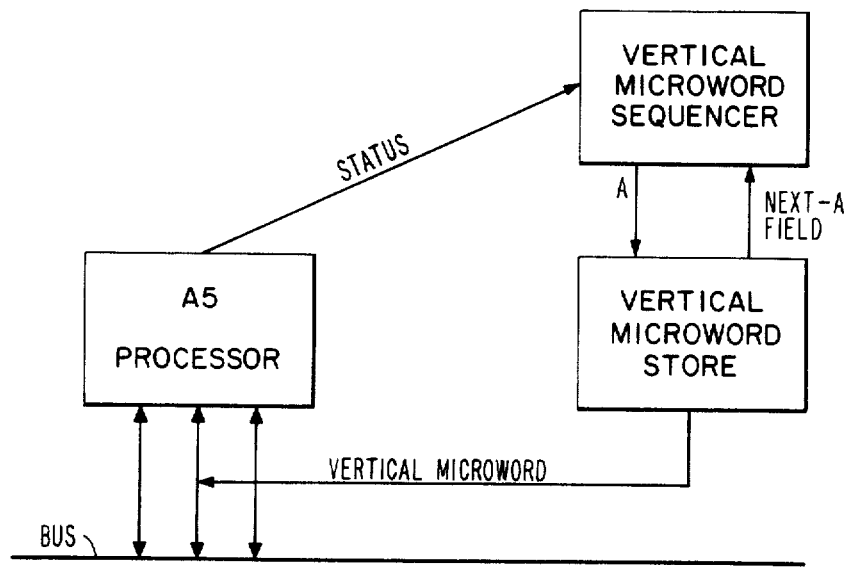
FIG. 6 schematically illustrates another partitioned mainframe instruction set, with said partitioning being implemented in accordance with the present invention by placing predetermined vertical microcode elsewhere than on the implementing microprocessor chip.

The three remaining approaches employ two levels of microcode. The fifth approach, shown in FIG. 6, has the advantages of using two levels of microcode with different widths. Current microprocessors achieve excellent cost/performance by allowing a single chip to contain both the control store and the data flow that it controls. Their cost/performance is further improved if the control store is wide, or "horizontal", rather than narrow or "vertical". A wide control store eliminates most decoding, so it reduces both complexity and propagation delay. In addition, a wide control store can control several simultaneous operations, so it improves performance. However, a wide control store usually needs to contain more bits than a narrow one in order to implement a given function. As used herein, the terms "narrow" or "vertical" storage or microcode are employed to signify that a use of a word length on the order of 16 bits, while the terms "wide" or "horizontal" signify a word length on the order of 100 bits. In between these two, although not used herein, is a mid-range word length of approximately 32 bits.

One common solution to the problem of a large wide control store, has been described with reference to the Motorola 68000 microprocessor. This solution is based on noting that the information in a wide control store is highly redundant; i.e., many control words have bits that are identical. The solution is to have both a wide horizontal store and a narrow vertical store. The horizontal store contains the few, non-redundant control bit patterns required by the data flow. The vertical store contains the many bit patterns that are necessary for sequencing through many machine instructions. Such an approach is said to reduce the total control store size by about a factor of two in the Motorola 68000 microprocessor.

Even with this approach, current microprocessors have insufficient on-chip control store to implement all of the microcode that is necessary to implement an architecture as complex as that found in a mainframe. Yet, there is a major cost/performance advantage in having all of the horizontal microcode on the same chip as the data flow, to avoid the many pins or bus cycles required to bring a wide control word onto the chip, and there is a cost/performance advantage in having the most frequently used vertical microwords on the same chip as the data flow to avoid any accesses to the off-chip bus in most microcycles. This leaves only the infrequently used vertical microwords to be stored off the microprocessor chip, in a microprocessor-based implementation of a large system or mainframe architecture.

Such an implementation leaves two detailed design problems to be solved. These problems are accommodated in the following manner. First, branch from on-chip to off-chip vertical microcode by setting a latch attached to a microprocessor output pin, by restricting on-chip vertical micro read-only memory (ROM), for example to 512 words, and branching to a word whose address exceeds 511, or by branching to the highest valid on-chip vertical microword address after setting the off-chip vertical microword branch address onto the data bus. Second, allow conditional branches to depend on status bits by bringing up to 16 raw status bits off the chip, by way of the data bus or dedicated pins, just before the data bus or other dedicated pins are used to bring the next vertical microword on chip or by using the branch control fields of the horizontal microwords to select just the desired status information and bring off of the chip just the low two bits of the address of the next off-chip microword.

Note that most horizontal microwords will probably be used by both on-chip and off-chip vetical microwords. However, some specially written horizontal microwords will have to be put onto the chip just for the use of the off-chip vertical microcode. That is, the microprocessor, as seen by the off-chip vertical control store, should interpret a thoroughly general and flexible vertical microcode language. This provides the ability to implement a complex mainframe architecture. The on-chip vertical microcode provides very high performance for the most-frequently-used portions of that architecture.

Other advantages of this method of partitioning microcode are that it allows microcoding for high speed, since coding for smallest size is not necessary, it allows off-chip vertical microcode, written for a first product, to be put in the on-chip vertical microstore in subsequent products whose microprocessors have larger Read Only Memory (ROM), and it encourages a microprogramming methodology of first selecting a set of useful horizontal microwords, and then stringing them together with vertical microwords, which increases microprogrammer productivity.

F. Off-Chip Horizontal Microcode

Figure 7:
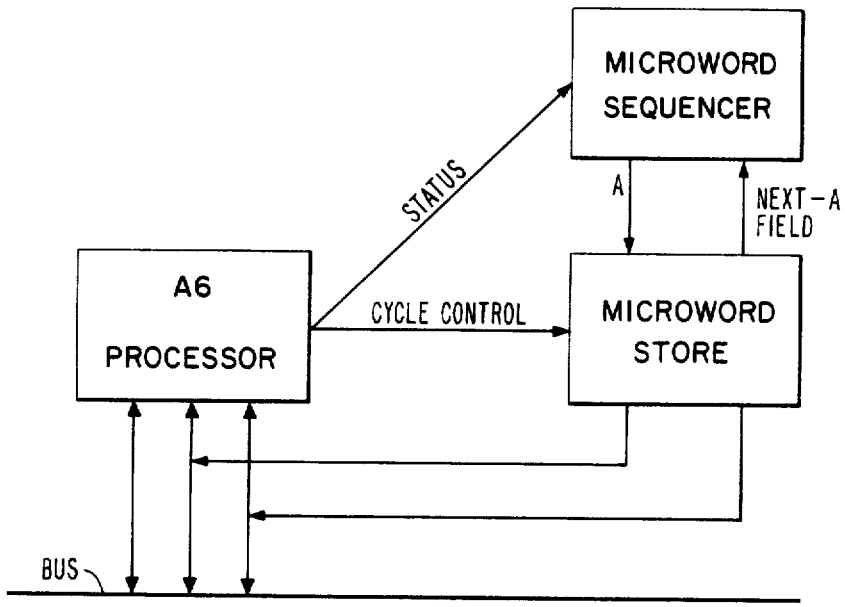
FIG. 7 schematically shows yet another partitioned mainframe instruction set, with said partitioning being implemented in accordance with the present invention by placing predetermined horizontal microcode elsewhere than on the implementing microprocessor chip.

The sixth approach, shown in FIG. 7, employs two sets of microwords that have the same width. One set is on the microprocessor chip and executes very rapidly. The other set is in an external store and can be very large. In a typical instruction mix, fixed-point, branch, and load instructions account for 95% of the instructions by frequency of occurrence, and for 60% to 75% of the instructions by execution time. Thus, these instructions are suitable candidates for this partitioning scheme to have on-chip. The remaining microwords, kept in an off-chip control store, are brought onto the chip one by one for execution. This could be done in several cycles using existing address and/or data pins for microword bits; or it could be done using dedicated pins. The off-chip control store must be wide enough for both the microword bits required by the data flow and the microword-selection bits required by the sequencer. The off-chip microword sequencer must have access to on-chip status information, in order to perform conditional microprogram branches and in order to pass control back and forth between on-chip and off-chip functions and instructions.

This method of partitioning the microcode necessary for implementing a complex mainframe architecture has the advantage of permitting an architecture of unlimited complexity to be implemented by use of a sufficiently large off-chip control store. Further, difficult parts of the architecture can be placed off-chip, where they can be corrected without altering the microprocessor chip itself. In addition, off-chip microcode written for a product so implemented may be placed on chip, with minimal modifications, if a subsequent product uses a microprocessor chip with larger on-chip control store. With care, patches to the on-chip microcode can be implemented in the off-chip microcode if errors are found. Since off-chip instructions are executed in the same engine as on-chip instructions, they have full access to registers, condition code, and other facilities of the machine yielding other advantages. A final advantage accrues from the fact that all accesses to main storage and channels are made by the same microprocessor.

The arrangement for partitioning microcode between on-chip and off-chip control stores allows the most frequently used instructions to benefit from the cost/performance of microprocessors due to the short critical path produced by on-chip microcode, and runs the remaining instructions and functions with the cost/performance characteristics of bit slices with the longer critical path produced by off-chip microcode.

G. Subset With Primitives

Figure 8:
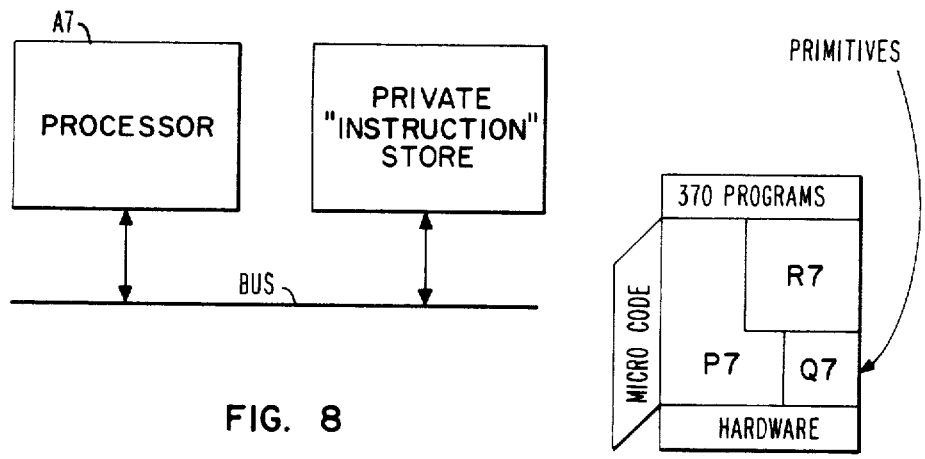
FIG. 8 schematically depicts still another partitioned mainframe instruction set, with said partitioning being implemented in accordance with the present invention by placing one subset and a collection of primitives on the implementing microprocessor chip.

The last approach, shown in FIG. 8, could produce a very economical processor at the expense of a difficult and prolonged development process. The most difficult aspect of this approach is defining suitable "primitive" operations. In principle, a microprocessor that contains on-chip microcode for a mainframe system's fixed-point, branch, and load/store instructions can be programmed to emulate the remainder of that system's architecture, as described under "Subset with Emulation" above. In practice, that design produces relatively poor performance for the instructions and functions that are emulated by off-chip code, rather than microcoded on the microprocessor chip. Microcoding some "primitives", instead of some instructions that could occupy the same on-chip control store space, can produce significantly higher performance on a complete instruction mix. A primitive is not itself a system instruction, but rather it executes a simple function that is useful in the emulation of more complicated instructions or functions. An emulation program can achieve higher performance if it has primitives available as well as the basic instructions. Examples of primitives are "load registers with contents of instruction fields", "set condition code according to arithmetic result" and "compute effective address."

This method of implementing a large system architecture on a microprocessor is itself implemented by subdividing the microprocessor's operation code space into the following three sets:

A. codes of high-usage instructions, each of which is implemented by a sequence of on-chip microcode;

B. codes assigned to primitives which are useful for emulating instructions, each of which is implemented by a sequence of on-chip microcode; and C. codes of the remaining low-usage instructions, each of which is implemented by a sequence of high-usage instructions (A) and primitives (B).

In operation, an instruction stream is being fetched from store. As long as these instructions' codes are found to be in set A, execution is controlled by on-chip microcode. Any codes in set B are illegal, in this mode. When an instruction's code is found to be in set C, direct execution of on-chip microcode is terminated after completion of that instruction's I-cycles, which can include effective address generation. The instruction code selects a starting address in a private program store, and the microprocessor fetches its next "instruction" from this address. That "instruction" code will be in set A or B, so it initiates a sequence of on-chip microcode. This sequence ends by fetching another "instruction" which initiates another sequence of on-chip microcode, and so on, until the instruction whose code was in set C has been completely emulated. Then the next instruction is fetched from store, not from the private program store. That instruction, too, is either executed directly by a sequence of on-chip microcode, or simulated by "instructions" in the private program store, which are in turn executed by sequences of on-chip microcode.

It should be noted that the emulation mode used to program a low-usage instruction, whose code is in set C, has the following special characteristics. In this mode, "instructions" are fetched from the private program store, not from main store. The instruction counter is not incremented and codes in both sets A and B are legal while emulating an instruction in set C. In addition, interrupts must be held pending until all of the "instructions" that emulated one instruction in set C are completed. Any instructions in set A, that are used along with primitives in set B to simulate an instruction in set C, must be prevented from changing the condition code or taking their ordinary exceptions.

Some advantages of this method of partitioning the architecture between on-chip microcode and off-chip emulation code are as follows. An instruction in set C can be simulated with relatively few bus cycles. An "instruction" brought in from the private instruction store by one or two bus cycles, initiates a sequence of many microwords which do not require bus cycles. Constant data needed by difficult instructions or by interrupts such as Translate and Test's implied register, or interrupts' many implied storage addresses, can be brought in easily as immediate fields of "instructions" fetched from the private program store. Such constants may be difficult to introduce by way of on-chip microcode. An architecture of unlimited complexity can be emulated by a sufficiently large private program store, if the codes in sets A and B supply functions or sufficient generality. The private program store can be relatively small, because it stores relatively powerful "instructions" each of which is interpreted by many microwords. This is especially true if powerful branch and subroutine call "Instructions" are used to save space.

The transfer of control from on-chip microcode to an off-chip emulation program need not be limited to the time when an I-cycle completes. On-chip microcode should be allowed to call for simulation of the rest of an instruction whenever it detects an unusual condition, so it does not require high performance, that is difficult to handle and would otherwise consume many valuable on-chip microwords. For example, the on-chip microcode for Move Characters should be able to call an off-chip program if it detects operand overlap.

H. Conclusion

The foregoing description has been specifically directed to a methodology by means of which state-of the-art microprocessors can be utilized to emulate mainframe architectures. A comparison summary of the various approaches is presented in Table I. This table should prove useful in comparing each approach with respect to different measures of goodness. Although the present invention has been described in the context of preferred embodiments thereof, it will be readily apparent to those skilled in the appertaining art, that modifications and variations can be made therein without departing from its spirit and scope. Accordingly, it is not intended that the present invention be limited to the specifics of the foregoing description of the preferred embodiments. Instead, the present invention should be considered as being limited solely by the appended claims, which alone are intended to define its scope.

TABLE I

| APPROACH | APPROACH NAME | RANK* P | RANK* B | RANK* D | RANK* R | MAIN ADVANTAGE | MAIN DISADVANTAGE |
|---|---|---|---|---|---|---|---|
| A | TWO OVERLAPPING SUBSETS | 7 | 7 | 2 | 1 | LOW BUILD COST, GOOD BALANCE | CAN NOT IMPLEMENT RICH ARCHITECTURE |
| B | FOUR SUBSETS, THREE MICROCODED | 6 | 2 | 4 | 7 | HIGH PERFORMANCE | HIGH BUILD COST |
| C | TWO SUBSETS, ONE MICROCODED | 4 | 6 | 6 | 7 | GOOD/COST PERFORMANCE | UNBALANCED PERFORMANCE |
| D | SUBSET WITH EMULATION | 1 | 6 | 7 | 6 | LOW COST | LOW AND UNBALANCED PERFORMANCE |
| E | OFF-CHIP VERTICAL MICROCODE | 3 | 5 | 5 | 5 | — | NEED COMPLETE SET OF HORIZONTAL MICROWORDS |
| F | OFF-CHIP HORIZONTAL MICROCODE | 2 | 1 | 3 | 7 | CAN IMPLEMENT RICH ARCHITECTURE | LOW PERFORMANCE |
| G | SUBSET WITH PRIMITIVES | 5 | 6 | 1 | 5 | GOOD COST/ PERFORMANCE SYSTEM/370 | NEED COMPLETE SET OF PRIMITIVES |

*RANK KEY (7 IS BEST):
PERFORMANCE
BUILD COST
DEVELOPMENT COST
RICHNESS OF IMPLEMENTABLE ARCHITECTURE

Having thus described our invention, what we claim as new and desire to secure by Letters Patent, is as follows:

1. A method for microprocessor implemented emulation of a mainframe computer, using a plurality of large scale integrated chip microprocessors, said main frame computer having a predefined instruction set and a set of general purpose registers associated therewith, said method comprising the steps of:
   (a) partitioning the instruction set of said mainframe computer into a plurality of subsets of enabling microcode, the enabling microcode of at least one of which subsets completely fits on and is entirely executable by and on a single said chip microprocessor;
   (b) providing chip based microprocessors on which said instruction set subsets are implemented, thus enabling each of said microprocessors capable of supporting said on-chip microcode;
   (c) providing each microprocessor with all of the necessary microcode to allow implementation and control execution of its resident subset instructions entirely on-chip;
   (d) providing at least one path between all of said microprocessors via which control can be passed back and forth between said microprocessors; and
   (e) providing at least one path between all of said microprocessors via which data can be passed back and forth between said microprocessors.

2. The method according to claim 1 wherein said completely fitting instruction subsets includes those instructions that make substantial use of the general purpose registers, including the step of providing the microprocessor chip on which said subset is resident with sufficient general purpose registers to handle the instructions of said subset of microcode for all of the subset's functions that make use of said general purpose registers.

3. The method according to claim 1 including the step of partitioning said mainframe instruction set into three subsets, P1, Q1 and R1, and wherein subsets P1 and Q1 are grouped together for complete implementation on a single microprocessor chip A1 and subsets P1 and R1 are grouped together for complete implementation on another single microprocessor chip B1.

4. The method according to claim 3 including the step of partitioning subset P1 to constitute about 95% of the mainframe instruction set by frequency of occurrence and about 70% of the instructions by execution time, with subsets Q1 and R1 partitioned to include only the remaining mainframe instructions.

5. The method according to claim 4 including the step of partitioning subset P1 to include only fixed-point, branch and load instructions, subset Q1 is partitioned to include only floating-point instructions and subset R1 is partitioned to include only decimal and privileged instructions.

6. The method according to claim 5 including the step of suporting said partitioning step by providing on-chip microcode for microprocessors A1 and B1 to implement the respective instruction subset groups of each.

7. The method according to claim 6 including the step of operating said microprocessors in non-contention with only one being active and the other passive at any one time.

8. The method according to claim 1 including the steps of partitioning said mainframe instruction set into four subsets, P2, Q2, R2 and S2, and providing an off-chip control store and microprocessor chips A2, B2, C2 and D2, said subsets P2, Q2 and R2 being each respectively completely implemented on microprocessor chips A2, B2 and C2, with all remaining mainframe instructions not found in said partitioned subsets P2, Q2, and R2, namely those contained in subset S2, being provided by simulation instruction sequences stored in said off-chip control store, with microprocessor chip D2 being used for initialization, PSW maintenance, start I/O and housekeeping functions.

9. The method according to claim 8 including the steps of partitioning subset P2 to implement I-cycles for all instructions and E-cycles for the fixed-point, load and branch instructions to gather therein all functions that make frequent use of general purpose registers, partitioning subset Q2 to implement E-cycles for floating-point instructions and partitioning subset R2 to implement E-cycles for decimal instructions.

10. The method according to claim 9 including the steps of partitioning subset P2 to constitute about 95% of the mainframe instruction set of frequency of occurrence and about 70% of the instructions by execution time, and partitioning subsets Q2, R2 and S2 to include only the remaining mainframe instructions.

11. The method according to claim 10 which further includes the step of providing microcode for each of said microprocessor chips A2, B2 and C2 to enable full implementation thereon of its assigned instruction subset.

12. The method according to claim 1 including the steps of partitioning said mainframe instruction set into two subsets, P3 and Q3, and providing an off-chip control store and microprocessor chips A3 and B3, said subset P3 being completely implemented on microprocessor chip A3, with all remaining mainframe instructions not found in said partitioned subset P3, namely those of subset Q3, being provided by simulation instruction sequences stored in said off-chip control store, with microprocessor chip B3 being used for executing said simulation instructions for said subset Q3 and also for address translation misses, exception conditions and interrupt handling.

13. The method according to claim 12 including the step of partitioning subset P3 to implement I-cycles for all instructions and E-cycles for the fixed-point, load and branch instructions to gather therein all functions that make frequent use of general purpose registers.

14. The method according to claim 13 which further includes the step of providing microcode for said microprocessor chip A3 to enable full implementation thereon of its assigned instruction subset P3.

15. The method according to claim 14 including the steps of partitioning subset P3 to constitute about 95% of the mainframe instruction set by frequency of occurrence and about 50% of the instructions by execution time, and partitioning subset Q3 to include only the remaining mainframe instructions.

16. The method according to claim 1 including the steps of partitioning said mainframe instruction set into at least subsets P4 and Q4, providing a microprocessor chip A4, implementing subset P4 completely on microprocessor chip A4 as the machine architecture thereof, and then providing at least one layer of software that will raise the level of subset P4 to that of the full mainframe architecture, said software layer including sufficient instructions and functions to simulate said instruction subset Q4, namely the mainframe architecture not defined in and by subset P4, including preservation of system integrity.

17. The method according to claim 1 including the steps of partitioning said mainframe instruction set into two subsets, P5 and Q5, and providing an off-chip control store that is suitable for storing vertical microcode therein, providing microprocessor chip A5, implementing said subset P5 completely on microprocessor chip A5, with all remaining mainframe instructions not found in said partitioned subset P5, namely those of subset Q5, being provided by vertical microcode stored in said off-chip control store, and using microprocessor chip A5 for managing said instruction subset Q5, and address translation misses, exception conditions and interrupt handling.

18. The method according to claim 17 including the step of partitioning subset P5 to implement all instructions that do not require infrequently used vertical microcode.

19. The method according to claim 18 which further includes the step of providing microcode for said microprocessor chip A5 to enable full implementation thereon of its assigned instruction sheet P5.

20. The method according to claim 19 which includes the additional step of including microcode on said microprocessor chip A5 to assist in the implementation of said off-chip vertical microcode.

21. The method according to claim 20 which includes the additional steps of providing a latch coupled to a microprocessor A5 output pin and branching from on-chip to off-chip vertical microcode by setting said latch whenever a predetermined condition occurs.

22. The method according to claim 1 including the steps of partitioning said mainframe instruction set into two subsets, P6 and Q6, and providing an off-chip control store that is suitable for storing horizontal microcode therein, providing microprocessor chip A6, implementing said subset P6 completely on microprocessor chip A6, with all remaining mainframe instructions not found in said partitioned subset P6, namely those of subset Q6, being provided by horizontal microcode stored in said off-chip control store, and using microprocessor chip A6 for this and for managing privileged instructions, address translation misses, exception conditions and interrupt handling.

23. The method according to claim 22 including the step of partitioning subset P6 to implement all instructions that do not require infrequently used horizontal microcode.

24. The method according to claim 23 which further includes the step of providing microcode for said microprocessor chip A6 to enable full implementation thereon of its assigned instruction subset P6.

25. The method according to claim 24 which includes the additional step of including microcode on said microprocessor chip A6 to assist in the implementation of said off-chip horizontal microcode.

26. The method according to claim 25 which includes the additional steps of providing a latch coupled to a microprocessor A6 output pin and branching from on-chip to off-chip horizontal microcode by setting said latch whenever a predetermined condition occurs.

27. The method according to claim 1 including the steps of partitioning said mainframe instruction set into two subsets, P7 and Q7, and providing an off-chip control store that is suitable for storing coded therein, providing a microprocessor chip A7, providing on-chip microcode for implementing said subset P7 entirely on said microprocessor A7, assigning and providing operation codes to identify and implement, as primitives, additional instructions in said instruction subset P7 using said on-chip microcode, and providing code for said instruction subset Q7 that is stored in said off-chip control store and is implemented by a mix of on-chip microcode and primitives.

* * * * *

UNITED STATES PATENT AND TRADEMARK OFFICE
CERTIFICATE OF CORRECTION

PATENT NO. : 4,514,803
DATED : April 30, 1985
INVENTOR(S) : Palmer W. Agnew et al It is certified that error appears in the above—identified patent and that said Letters Patent is hereby corrected as shown below:

Column 16, line 46, "suporting" should read --supporting--.

Column 17, line 8, "of" (second occurrence) should read --by--.

Column 18, line 12, "sheet" should read --subset--.

Signed and Sealed this

Twenty-second Day of October 1985

[SEAL]

Attest:

DONALD J. QUIGG

Attesting Officer

Commissioner of Patents and
Trademarks—Designate